Jan. 20, 1953     O. D. CALDWELL     2,626,184
AUXILIARY AIR AND WATER SUPPLY FOR AUTOMOBILES
Filed July 10, 1950     2 SHEETS—SHEET 1
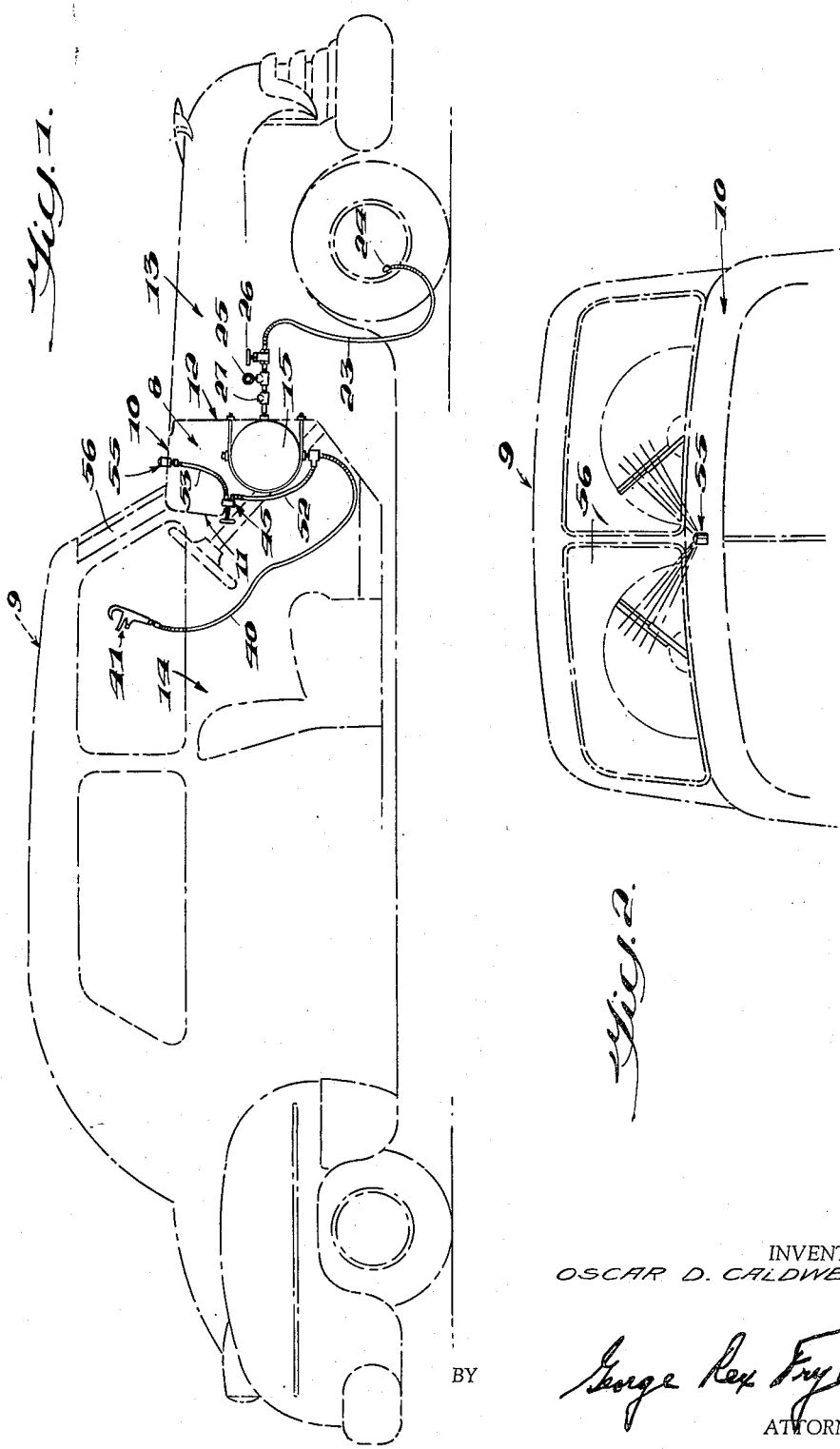
INVENTOR
OSCAR D. CALDWELL,
BY
George Rex Frye.
ATTORNEY Jan. 20, 1953   O. D. CALDWELL   2,626,184
AUXILIARY AIR AND WATER SUPPLY FOR AUTOMOBILES
Filed July 10, 1950   2 SHEETS—SHEET 2
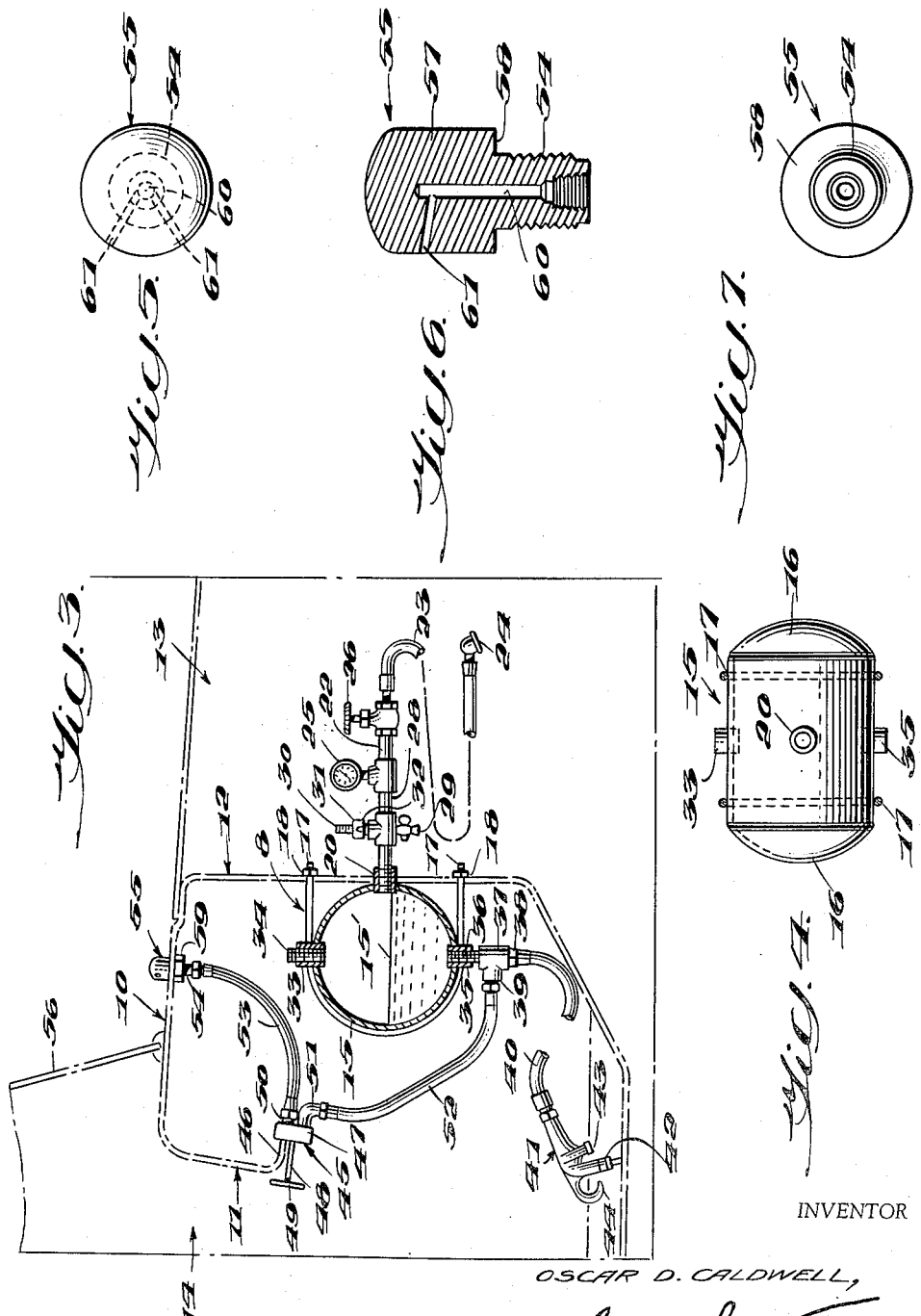
INVENTOR
OSCAR D. CALDWELL,
BY George Rex Frye,
ATTORNEY Patented Jan. 20, 1953

2,626,184

UNITED STATES PATENT OFFICE 2,626,184

AUXILIARY AIR AND WATER SUPPLY FOR AUTOMOBILES

Oscar D. Caldwell, Oklahoma City, Okla.

Application July 10, 1950, Serial No. 172,905

4 Claims. (Cl. 299—58)

1

This invention relates to an automobile accessory combining the functions of windshield washing, supply of water under pressure for washing other windows or other portions of the automobile and for other purposes, and supply of compressed air for inflation of tires of the automobile, the primary object of the invention being to provide an efficient and practical device of this kind in a compact, unitary form which can be easily installed in an out of the way position on the firewall or dashboard in the driver's compartment of an automobile without displacing or interfering with the operation of other accessories, such as heaters and radios.

Another important object of the invention is to provide a unitary, multi-purpose accessory of the character indicated above which employs a single tank containing both the water supply and the air supply under pressure. The air being located above the water in the tank, in such an arrangement that either the water or the air can be simultaneously or separately withdrawn or discharged from the tank for particular purposes such as windshield washing and inflation of tires, requiring only water or only air under pressure, respectively, as long as compressed air and water remain in the tank.

A further important object of the invention is to provide a device of the character indicated above wherein there are separately connected to the tank, a single conduit terminating in a flexible tire inflating hose having an air chuck or tire valve coupling and containing a manual shut-off valve, a pressure gauge, and a fitting combining the functions of a filler cap and level controlling pet cock for water for the tank, and a compressed air valve, like a tire valve, enabling introduction of compressed air into the tank above the water therein by means of a pump or a service station air hose; and a dual conduit connected to the tank below water level and involving a branch having a hand valve therein and leading to a windshield spray head mounted on the cowl, and another branch terminating in a flexible hose having a valved hand spray nozzle thereon.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 1 is a general right hand side elevation showing the embodiment installed on an automobile, the latter being shown in dot-dash lines.

Figure 2 is a fragmentary right hand elevation of Figure 1.

Figure 3 is a right hand side elevation of the embodiment, partly broken away and in section, showing the relation of the components to portions of an automobile, the latter being shown in dot-dash lines.

Figure 4 is a front elevation, partly in section, of the tank.

Figure 5 is an enlarged top plan view of the windshield spray head.

Figure 6 is a transverse vertical section taken therethrough; and,

Figure 7 is a bottom plan view thereof.

Referring in detail to the drawings, the numeral 8 generally designates the illustrated unitary device as a whole as installed in an automobile 9, the device having components positioned relative to the cowl 10, the instrument panel 11, and the firewall or dashboard 12, the latter having at its front side the engine compartment 13, and the driver's compartment 14.

The device 9 comprises a preferably horizontally and transversely elongated, preferably cylindrical tank 15 having hemispherical ends 16 and adapted to be secured to the rearward side of the dashboard 12 beneath the instrument panel 11 by means of U-shaped clamping rods embracing the rearward side of the tank and having terminals 17 projecting forwardly through the dashboard 12 and provided with clamping nuts 18.

Midway between the tank ends the tank sidewall 19 has a horizontal forwardly projecting tubular fitting 20 which is located above the contemplated maximum level of water 21 in the tank 15, as indicated in Figure 3. The fitting 20 extends forwardly through the dashboard 12 and has threaded therein the rearward end of a rigid preferably horizontal conduit, such as a pipe 22, on whose forward end is secured one end of a flexible tire inflating hose 23 having a tire valve coupling 24 in its other end. Midway between the ends of the pipe 22 a pressure gauge 25 is connected thereto, serving as a guide to proper filling of the tank 15 with compressed air and as an indicator of air pressure remaining in the tank after partial use thereof. The hose 23 can be of a length to reach any of the tires of the automobile 8, and is to be stored in the engine compartment 13.

Connected in the pipe 22 in front of the pressure gauge 25 is a hand valve 26 which controls supply of compressed air to the tire inflating hose 23 from the tank 15.

Connected in the pipe 22 behind the pressure gauge 25 is a combination fitting 27 having a body 28 involving a depending pet-cock 29 arranged to be used after replenishing the supply of water in the tank 15 to limit the water to a predetermined level 15' in the tank 15, below the fitting 20. The body 28 further involves a vertically projecting compressed air input valve 30, in the nature of a tire valve, the valve 30 forming part of a removable filling cap or plug 31, threaded on a filling neck 32 on the upper side of the body 28, through which water is adapted to be introduced into the tank 15.

In the same vertical plane as the fitting 20, the top part of the tank sidewall 19 has rising therefrom a clean out fitting 33 closed by a removable plug 34; and the bottom part of the sidewall 19 has depending therefrom a vertical tubular fitting 34. Threaded upwardly into the fitting 35 is the upper arm 36 of a T-coupling 37, having a depending lower arm 38 and a horizontal or lateral arm 39.

A flexible hose 40 has one end connected to the lower arm 38 of the T-coupling 37 and has on its other end a general utility hand spray 41 including a nozzle 42, a normally closed manual valve 43, and a hanging hook 44, the spray 41 being arranged to be used to wash any part of the automobile, such as the windshield, the side windows, and the rear window, and can also be used to spray water or other liquid from the tank 15 to extinguish a fire in the automobile, and for other purposes, simply by holding the spray 41 in the proper position and operating the valve 43. The hose 40 may be of any desired or suitable length and is adapted to be coiled in an out of the way position within the driver's compartment 14, preferably in the region of the tank 15.

A windshield washer control valve 45 is mounted preferably on the lower flange 46 of the instrument panel 11 and comprises a valve body 47, a valve stem 48 extending from the body 47 having a handle 49 in its rearward end, and upper and lower nipples 50 and 51, respectively, projecting forwardly from the body 47. A preferably flexible tube or pipe 52 has one end connected to the lateral arm 39 of the T-coupling 37 and the other end to the lower nipple 51 of the valve 45. Another such tube or pipe 53 has one end connected to the upper nipple 50 of the valve 45 and its other end connected to the depending nipple 54 on the single windshield spray head 55, which is mounted through the cowl 10 in front of and at the middle of the windshield 56. In its open position, obtained by turning the handle 49, the valve 45 permits water from the tank 15 to reach and be sprayed from the spray head 55 onto both panes of the windshield 56.

The windshield spray head 55 preferably comprises a solid vertical cylindrical body 57 having a reduced, externally threaded lower portion serving as the connection nipple 54 for the pipe 53. The reduced portion 54 defines a shoulder 58 at its upper end to engage the upper surface of the cowl 10 with the portion 54 passing downwardly through the cowl and being provided with a clamping nut 59 to engage the underside of the cowl 10. The body 57 has an axial bore 60 opening through the lower end of the nipple portion 54 and terminating at its upper end within the upper end of the body 57, as shown in Figure 6. Opening into the upper part of the bore 60 is a pair of rearwardly inclining, laterally angulated spray bores 61' serving as jets, which direct water under pressure onto the opposite panes of the windshield 56.

From the above description, it will be apparent that I have provided an auxiliary air and water supply for automobiles which is simple and economical to manufacture and may be readily installed in practically any automobile. It provides separate controls for admitting and delivering either air or water into or from the supply tank, which controls are readily accessible whenever needed. Water under pressure may be delivered to both panes of the windshield while the vehicle is in motion under control of a valve handy to the driver, and water or air may be delivered through other conduits to any desired place of use while the vehicle is at rest. Replenishment of both water and air under pressure may be made at any service station whenever required.

While the illustrated embodiment of my invention is believed to adequately fulfill the objects and advantages hereinabove stated, it is to be understood that modification and variation may readily be made, within the spirit and scope of the subjoined claims.

What is claimed is:

1. In a compressed air and water supply device for an automobile, a closed tank for compressed air and water, means for limiting water in the tank to a predetermined level below the top of the tank and locating the compressed air above the water in the tank, a first conduit leading from said tank at a level above the water level therein comprising a tire inflating hose, valve means for controlling flow of compressed air from said tank through said tire inflating hose, a combined fitting connected in said first conduit at a point between said tank and said valve means, said combined fitting comprising a water filling neck, a filling cap on said neck, said cap being removable to enable replenishing the water in said tank through said neck, a normally closed compressed air admitting valve on said cap enabling replenishing the compressed air in the tank at a level above the water therein, and a normally closed drain valve on a lower part of said combined fitting, said drain valve being adapted to be opened to limit the water in the tank to the predetermined level, a second conduit connected to said tank below the water level, in which water from the tank is under pressure from the compressed air in the tank, and valved water utilization means connected to said conduit.

2. In a compressed air and water supply device for an automobile, a closed tank for compressed air and water, means for limiting water in the tank to a predetermined level below the top of the tank and locating the compressed air above the water in the tank, a first conduit leading from said tank at a level above the water level therein comprising a tire inflating hose, valve means for controlling flow of compressed air from said tank through said tire inflating hose, a combined fitting connected in said first conduit at a point between said tank and said valve means, said combined fitting comprising a water filling neck, a filling cap on said neck, said cap being removable to enable replenishing the water in said tank through said neck, a normally closed compressed air admitting valve on said cap enabling replenishing the compressed air in the tank at a level above the water therein, and a normally closed drain valve on a lower part of said combined fitting, said drain valve being adapted to be opened to limit the water in the tank to the predetermined level, a second conduit connected to said tank below the water level, in which water from the tank is under pressure from the compressed air in the tank, and valved water utilization means connected to said conduit, said water utilization means comprising a windshield spray head.

3. In a compressed air and water supply device for an automobile, a closed tank for compressed air and water, means for limiting water in the tank to a predetermined level below the top of the tank and locating the compressed air above the water in the tank, a first conduit leading from said tank at a level above the water level therein comprising a tire inflating hose, valve means for controlling flow of compressed air from said tank through said tire inflating hose, a combined fitting connected in said first conduit at a point between said tank and said valve means, said combined fitting comprising a water filling neck, a filling cap on said neck, said cap being removable to enable replenishing the water in said tank through said neck, a normally closed compressed air admitting valve on said cap enabling replenishing the compressed air in the tank at a level above the water therein, and a normally closed drain valve on a lower part of said combined fitting, said drain valve being adapted to be opened to limit the water in the tank to the predetermined level, a second conduit connected to said tank below the water level, in which water from the tank is under pressure from the compressed air in the tank, and valved water utilization means connected to said conduit, said water utilization means comprising first and second branch conduits connected to said second conduit, a windshield spray head connected to said first branch conduit, control valve means in said first branch conduit and a valved general utility spray connected to said second branch conduit.

4. In a device of the character described, a closed tank for containing water in its lower portion and compressed air above the water, a first conduit connected to the tank above the water level and terminating in an inflating hose, a first control valve in said first conduit controlling flow of compressed air from said tank to said inflating hose, a combined fitting in said first conduit, between the tank and said first control valve, including a water filling cap and a compressed air introducing valve for selectively introducing water and air into the tank while said first control valve is closed, a second conduit connected to the tank below the water level and having a first branch and a second branch, a spray head connected to said first branch, a second control valve in said first branch controlling passage of water under pressure from said tank to said spray head, and a valved spray head connected to said second branch.

OSCAR D. CALDWELL.

REFERENCES CITED

The following references are of record in the file of this patent:

UNITED STATES PATENTS

| Number | Name | Date |
| --- | --- | --- |
| 1,244,686 | Manford et al. | Oct. 30, 1917 |
| 1,973,939 | West | Sept. 18, 1934 |
| 2,114,558 | Dismukes | Apr. 19, 1938 |
| 2,306,778 | Carney | Dec. 29, 1942 |